(12) United States Patent
Saguy

(10) Patent No.: US 8,285,587 B2
(45) Date of Patent: Oct. 9, 2012

(54) SYSTEM FOR MULTIPLE SIGNERS ON AN ELECTRONIC CARD AND GIFT

(75) Inventor: Dotan Saguy, New York, NY (US)

(73) Assignee: BillMyParents, Inc., San Diego, CA (US)

(*) Notice: Subject to any disclaimer, the term of this patent is extended or adjusted under 35 U.S.C. 154(b) by 479 days.

(21) Appl. No.: 12/577,535

(22) Filed: Oct. 12, 2009

(65) Prior Publication Data

US 2010/0106785 A1  Apr. 29, 2010

Related U.S. Application Data

(63) Continuation of application No. 11/426,299, filed on Jun. 23, 2006, now abandoned, which is a continuation of application No. 10/063,108, filed on Mar. 21, 2002, now abandoned.

(60) Provisional application No. 60/277,697, filed on Mar. 21, 2001.

(51) Int. Cl.
*G06Q 30/00* (2012.01)

(52) U.S. Cl. ....................................................... 705/14.1
(58) Field of Classification Search .................. 705/14.1
See application file for complete search history.

(56) References Cited

U.S. PATENT DOCUMENTS

| | | | |
|---|---|---|---|
| 6,507,865 B1 * | 1/2003 | Hanson et al. | 705/36 R |
| 6,804,806 B1 | 10/2004 | Bansai | |
| 2002/0042775 A1 * | 4/2002 | Nelson et al. | 705/39 |
| 2002/0052756 A1 | 5/2002 | Lomangino | |
| 2002/0087427 A1 * | 7/2002 | Ganesan et al. | 705/26 |

* cited by examiner

*Primary Examiner* — Daniel Lastra
(74) *Attorney, Agent, or Firm* — Procopio, Cory, Hargreaves & Savitch LLP

(57) ABSTRACT

The current invention is a viral group greeting cards Internet service. It is a method and process that is an electronic greeting card service that utilizes the distributed access afforded by the Internet or local area networks (LANs) to enable the collection of greetings from multiple users on a single greeting card and its delivery to a recipient. It also allows for the pledges and collection of funds from multiple parties for a gift.

8 Claims, 5 Drawing Sheets

SYSTEM FOR MULTIPLE SIGNERS ON AN ELECTRONIC CARD AND GIFT

RELATED APPLICATION

This application is a continuation application of U.S. patent application Ser. No. 11/426,299, filed Jun. 23, 2006; which is a continuation of U.S. patent application Ser. No. 10/063,108 filed Mar. 21, 2002, now abandoned; which bases its priority on provisional patent application 60/277,697, filed Mar. 21, 2001, which are hereby incorporated by reference in their entirety.

FIELD OF THE INVENTION

The invention relates to art of Electronic Cards and Gifts, specifically an improvement for the use with multiple senders.

DESCRIPTION OF PRIOR ART

With the new E-Word with E-commerce and e-greetings there is a need for an easy, inexpensive, and convenient method for multiple people to electronically sign and send an electronic greeting and gift. There are many services such as American Greetings that allow the sending of electronic greeting cards. These cards are from a single user to a single user.

The current method is to have a single sender use one of the many Electronic Greeting card companies to pick out and send an electronic greeting to the recipient or to multiple recipients. Many of these services allow the sending of electronic gift certificates, but none of these allow multiple people to pledge specific contributions to a gift. These are limited in scope allowing only one person to sign and comment on the card. Evite.com is a web-site that has a "one-to-many" model that allows a single person to invite multiple people to an event.

Currently, if a person wants to have multiple signatures on a greeting, a paper card must be used. And if that person wants to include a gift, then cash money must be gathered from everyone who wanted to contribute. This is very cumbersome in today's paper-less world.

There is still room for improvement within the art.

SUMMARY OF INVENTION

It is the object of this invention to provide an easy, inexpensive, and convenient method for multiple users to sign an electronic card and to pledge money to a group gift.

The current invention is a viral group greeting cards Internet service. More particularly, the present invention relates to an electronic greeting card service that utilizes the distributed access afforded by the Internet or local area networks (LANs) to enable the collection of greetings from multiple users on a single greeting card and its delivery to a recipient. The viral aspect of this service allows it to aggregate a large member base without having to be marketed by its owner. This viral marketing component is due to the fact that it establishes a foundation and process where users can market the service to each other simply by using it.

Using the service, a group greeting card can be easily initiated by any Internet user. The user who initiates the greeting card (sender) selects the occasion for the card, enters his/her relationship to the recipient (for example: friend, brother, sister, etc.) and enters the name and email address of the recipient. The sender enters the subject and main message of the email they want to use in order to invite other users (invitees) to sign the greeting card. Then for each invitee, the sender enters a first name, an email address, and an optional invitee-specific note that will be appended to the invitation email for that particular invitee. By default, the optional personalized note encourages the invitee to invite other users to sign the greeting card. The sender can and is encouraged to invite as many users as he/she wants to sign the greeting card, which enhances the viral aspect of the service.

Once they receive the invitation email, each invitee clicks on the URL, which leads them to a personalized web page where they can sign the greeting card. Signing the greeting card consists of adding a text message to the electronic group greeting card. After reviewing the message, the invitee can submit it. A notification is sent to all the invitees of the greeting card to let them know that a new message has been added to the card so that they can connect to the service and see it. The invitee is then sent to a web page where he/she can see all the messages added to the card so far. The invitee can edit his/her message from this page. The invitee can also invite more friends to sign the greeting card, which enhances the viral aspect of the service.

When the sender deems that enough invitees have "signed" (added their message to) the card, he/she can have the service deliver the card to the recipient. The sender is then asked to enter a personal delivery message for the recipient, This personalized delivery note is included in the recipient's notification email, which invites the recipient to follow a URL in order to see their group greeting card.

The recipient can then see all the messages from the invitees who have submitted their message so far. The recipient does not see the names of the invitees who have not yet submitted a message but as new messages come in, the recipient can see them as well. Messages from invitees can be added to the card after the card has been delivered to the recipient. The recipient can choose to thank all the invitees who signed the card with a common message, which will be relayed by the service.

OBJECTS AND ADVANTAGES

The current invention allows for a simple and easy way to allow multiple senders and more than one person to contribute to an electronic gift. These are things that were not able to be done easily before the current invention. It is a key addition to a new electronic paper-less world.

BRIEF DESCRIPTION OF THE DRAWINGS

Without restricting the full scope of this invention, the preferred form of this invention is illustrated in the following drawings.

DETAILED DESCRIPTION

The preferred embodiment of the invention is described below. This invention relates to an Internet service. More particularly, the present invention relates to an electronic greeting card service that utilizes the distributed access afforded by the Internet or local area networks (LANs) to enable the collection of greetings from multiple users on a single greeting card and its delivery to a recipient. The viral aspect of this service allows it to aggregate a large member base without having to be marketed by its owner. This viral marketing component is due to the fact that it establishes a foundation and process where users can market the service to each other simply by using it.

The current invention uses Internet communications tool, browser, ISP (Internet Service Providers), embedded website, URL, protocols and languages that are known to one skilled in the art and therefor not disclosed here in detail.

Figure 1:
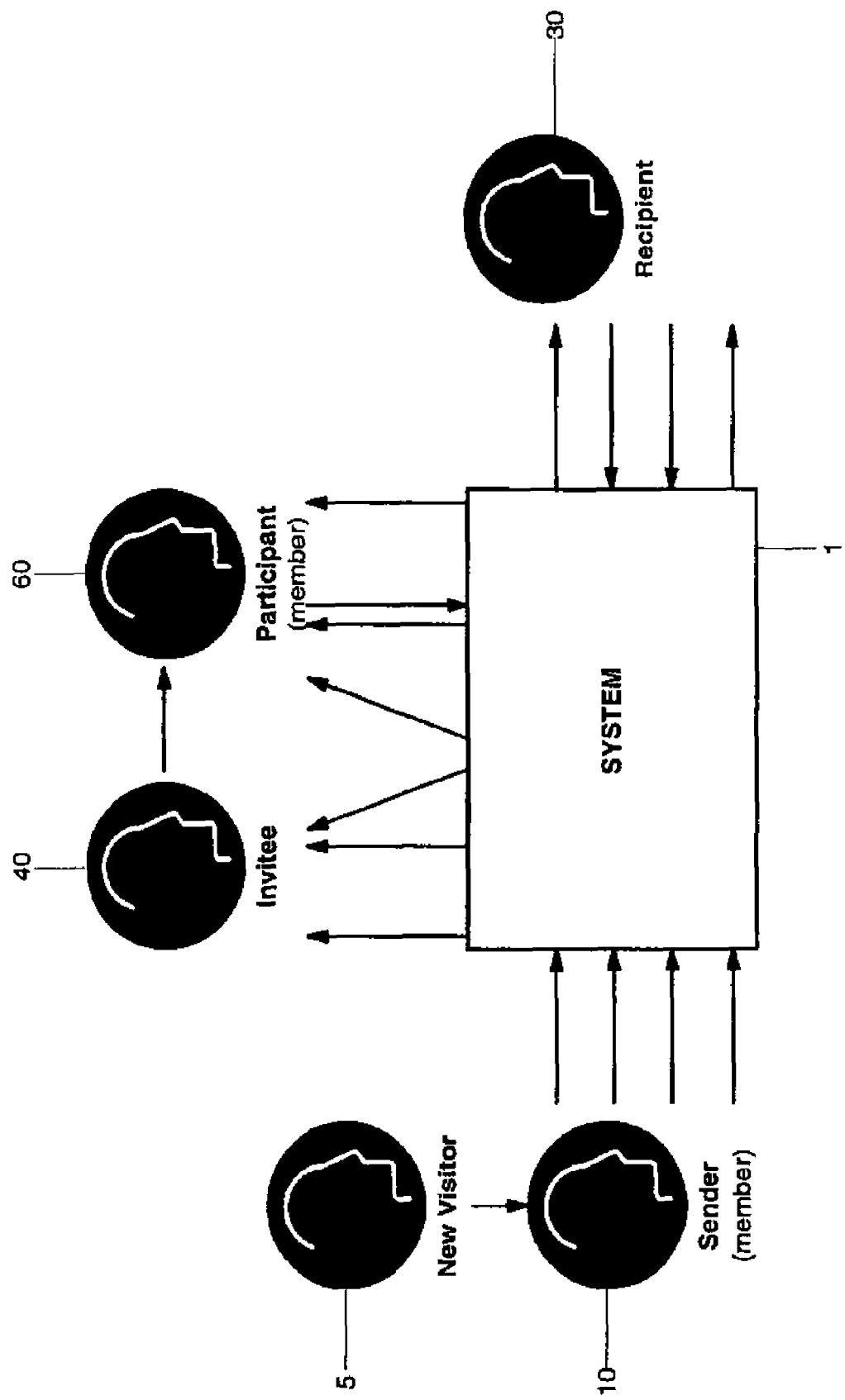
FIG. 1 displays the key people involved in the system.

FIG. 1 displays the key people involved in the system 1 and the flow of information between them and the system 1. A new visitor 5 registers to become a sender 10. The sender 10 initiates the process by picking an electronic greeting 20 to send to recipient 30. The sender 10 informs the invitees 40 of the electronic greeting 20 requesting them to sign the electronic greeting 20. After the sender 10 feels enough invitees 40 have signed the electronic greeting 20, he/she forwards an E-mail notice to the recipient 30 informing them about the electronic greeting 20. After the invitees 40 signs the electronic greeting 20 and sign up on the system 1 she/he becomes a participant 60. The system 1 also allows the sending of electronic gifts 50.

Figure 2:
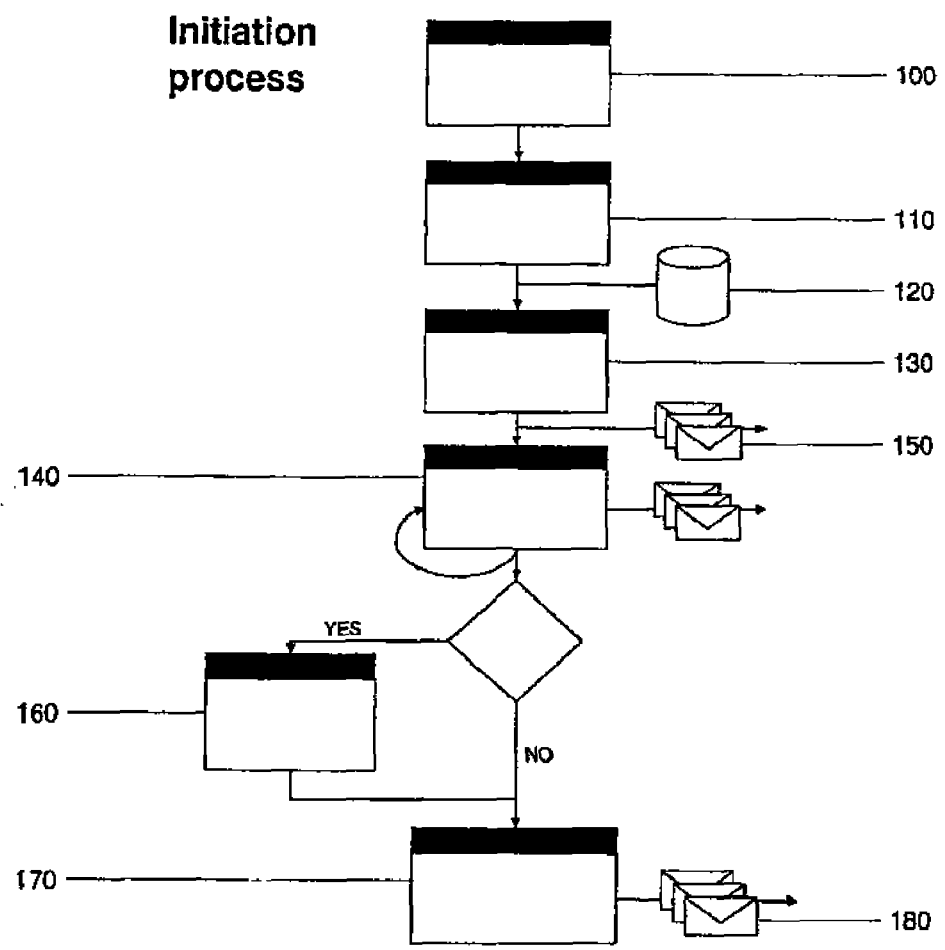
FIG. 2 shows the initiation process of the preferred embodiment.

The initiation process of the preferred embodiment of the current invention is shown in FIG. 2. The steps for initiating use of the group electronic greeting 20 are as follows. A sender 10 initiates the group electronic greeting 20. As shown in step 100, the sender 10 enters the web-site, selects the occasion for the card and signifies that they want to initiate an electronic greeting 20 usually by clicking an action button on the screen. As shown is step 110, first time senders 10 also need to enter his/her own information including name, email address and create a password for authentication during future visits.

In step 120, new visitors are added to a system database as a system member and a sender of electronic greetings 20. In step 130, the sender 10 then enters the subject and main message of the E-mail they want to use in order to invite other users (invitees 40) to sign the electronic greeting 20. Both a personalized subject and a personalized main message are pre-populated and can be edited by the sender 10.

Then as shown in step 140, the sender 10 invites as many invitees 40 its they desire. One sender 10 for each invitee 40 enters a first name, an email address and an optional invitee-specific note that will be appended to the invitation email 150 for that particular invitee 40. By default, the optional personalized note encourages the invitee 40 to invite other users to sign the electronic greeting 20. The message sent to all the invitees 40 also contains instructions, an Universal Resource Locators (URL) for proceeding as well as an incentive to act quickly. The sender 10 can and is encouraged to invite as many users as he/she wants to sign the greeting card, which enhances the viral aspect of the service.

As shown in step 160, the sender 10 chooses whether to ask each invitee 40 to join in contributing for a gift pool. And in step 170 the sender 10 can send out E-mail reminders 180 to those invitees 40 who haven't contributed or pledged amounts to the gift pool yet.

In the preferred embodiment each invitee 40 then receives a personalized invitation email with the following structure: "Subject: Hi <invitee first name> Main message: <Sender's name> has invited you to sign a group greeting card for <recipient's name>. Optional invitee-specific note: By the way, if you think of other friends of <recipient's first name>'s that you'd like to invite after you sign the card, go ahead! (there'll be an 'Invite more friends' button on the Groupcard page) Instructions: It's really easy and fun. Just click the link below . . . <Universal Resource Locators (URL) of the Internet service appended with parameters to return to a personalized page where the invitee can sign the greeting card> You'll also be able to see what other friends of Rita are writing . . . . Incentive to act quickly: DON'T WAIT!: If you click above and sign the greeting card within 24 hours of receiving this email, you will automatically be entered to win a $100 Amazon.com gift certificate! (see below for details):"

In the preferred embodiment, the sender 10 would have administrative rights on all the messages that are added to the electronic greeting 20. They could delete any inappropriate messages, or even delete the whole electronic greeting 20.

Figure 3:
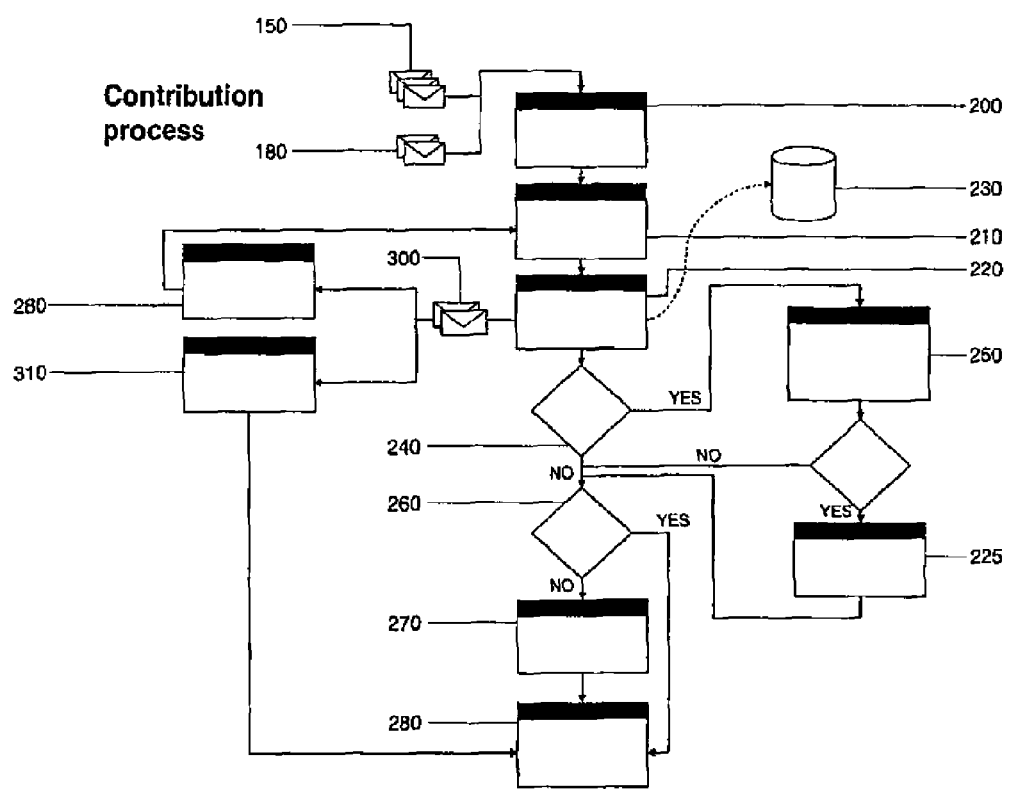
FIG. 3 displays the contribution process of the system.

The contribution process of the preferred embodiment is shown in FIG. 3. In step 200 the invitees 40 receive an E-mail invitation 150 or an E-mail reminder 180. The invitee 40 clicks the embedded URL address contained in the E-mail. As shown in step 210, this will transfer the invitee 40 to a personalized web-site where the invitee 40 is invited to enter their message for the recipient 30 and sign the electronic greeting 20.

In step 220, the invitee 40 enters their message for the recipient 30. That message 230 is included in the electronic greeting 20. All other invitees 40 and the sender are notified by notification E-mail 300 that someone else has signed the card.

Step 240 asks the question is there a gift pool? If yes, the invitee 40 chooses whether or not to contribute to the gift pool and what amount to contribute 250. The invitee 40 can choose to pledge a certain amount and enters their card information 225.

Step 260 asks is the invitee 40 a member? If no, then as shown in step 270, the invitee 40 enters her/his own information including name, email address and create a password for authentication during future visits. At this point, the invitee 40 has become a full member of the service and can initiate other electronic greetings 20 for other people, which is the core to the viral aspect of the invention. This qualifies an invitee 40 as a participant 60. If the answer to step 260 is yes then step 270 is skipped.

In step 280, a participant 60 can review all other messages, can edit their own message and can invite more people to sign the electronic greeting 20. In step 290, when other invitees 40 receive the notification E-mail 300, they can decide to contribute to the gift pool and/or see other invitee's messages and go to step 210.

In step 310, when participants 60 receive a notification E-mail 300 and they want to see the added message they go to step 280.

Figure 4:
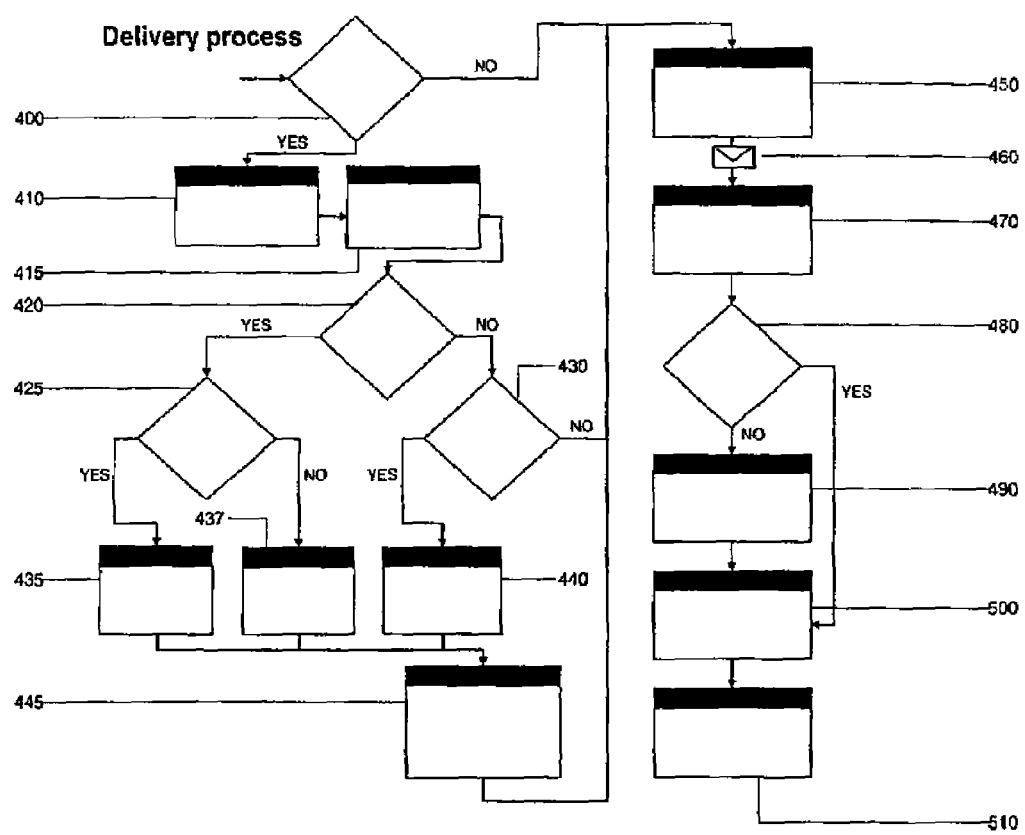
FIG. 4 displays the delivery process of the system.

When the sender 10 deems that enough invitees have "signed" (added their message to) the electronic greeting 20, the sender 10 initiates the delivery process. The delivery process of the preferred embodiment is shown in FIG. 4.

In step 400, the question is asked whether or not a gift pool been opened by the sender 10. If yes, then in step 410 the sender 10 reviews all the participants' 60 contributions to see if the amount of pledges and then in step 415 enters the amount of money that the sender 10 wants to pledge or contribution.

In step 420, the question is asked after reviewing the contributions whether or not enough money was contributed or pledged for the sender 10 to buy a group gift 50. If yes, then in step 425 the sender 10 decides if they want to buy a more expensive group gift 50 with the excess money pledged or contributed. If the sender 10 does want to buy a more expensive gift they select it from the gift pool 435. If the sender 10 wants to buy the original gift 50 the sender 10 confirms their choice in step 437.

If not enough money to buy the group gift 50 was contributed or pledged, in step 430, the sender 10 decides if they want to get a lower cost gift 50. If yes, the sender 10 selects a group gift 50 for the amount of money contributed and pledged in step 445. If no, the process continues to step 450. In step 445, the sender 10 collects the money from the contributions and pledges for the gift 50 from the invitees 40. This can be done through any standard method including PayPal, or collecting the money from the Participants 60 in person or having the system 1 collect it through credit cards or electronic money transfers. It is at this time that the system retrieves the money from the pledges. In the preferred embodiment, any excess contributions are return and pledge accounts are hit pro rata. The process goes to step 450.

In step 450, the sender 10 sends a delivery E-mail 460 to the recipient 40 indicating the electronic greeting 20 and if there is a gift 50 then that notification is given as well. In step 470, the delivery E-mail 460 is sent to the recipient's 30 E-mail address, which invites the recipient to follow a URL address in order to see their group electronic greeting 20.

After the recipient 30 clicks on the URL included in his/her email, if the recipient 30 is not yet a member of the service, he/she is first asked to choose a password for authentication during future visits. The recipient 30 has then become a member of the service. In step 500, the recipient 30 can then see all the messages from the invitees 40 who have submitted their message so far. The recipient 30 doesn't see the names of the invitees 40 who haven't yet submitted a message but as new messages come in, the recipient 30 can see them as well. Messages from invitees 40 can be added to the card after the card has been delivered to the recipient 30.

In step 510, the recipient 30 can choose to thank all the invitees 40 who signed the card with a common message, which will be relayed by the service.

Operation

Figure 5:
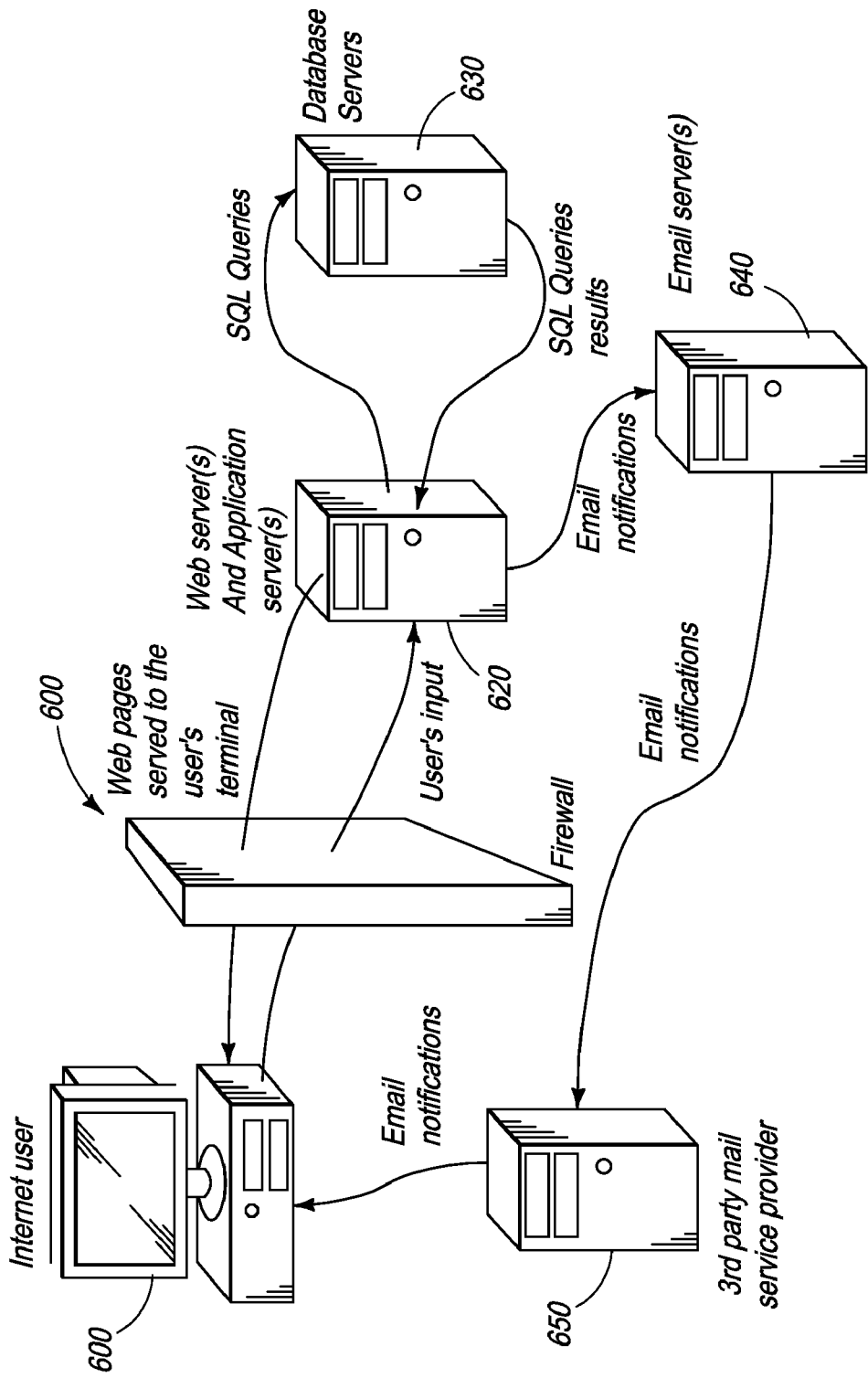
FIG. 5 displays a user connecting to the system.

As shown in FIG. 5, an Internet user uses a personal computer 600 and an Internet browser and ISP to connect by the Internet to the electronic greeting system's web and application server(s) 620 through the service's web page. This communication is done using standard Internet protocols and through a standard firewall security system 610. The web and application server(s) 620 use standard SQL queries to read and write data to a database server 630. Data such as log-ons, passwords and message are transmitted back and forth. The web and application server(s) 620 sends E-mail notifications to an E-mail Server(s) 640. The E-mail server(s) 640 sends E-mail notifications to the Internet Users through 3.sup.rd party E-mail service providers 650.

Advantages

Over time, as more people own computers and use E-mail as their standard communication, there really exists a need to be able to send electronic greetings while allowing more than one person to sign the electronic card. There also exists the need to allow for more than one person to pay on an electronic gift that can be sent with that card. The current invention solves these problems. It allows for a simple and easy way to allow multiple senders and it allows for a simple and easy way for more than one person to contribute to an electronic gift. These are things that could not be easily done before the current invention. It is a key component in the new electronic paper-less world.

CONCLUSION, RAMIFICATIONS, AND SCOPE

With the need for people to send electronic cards and gifts associated with those cards from a number of people, the current invention allows this to happen. The current invention solves the many problems of using electronic greetings. Although the present invention has been described in considerable detail with reference to certain preferred versions thereof, other versions are possible. For example, a different logic flow for the electronic greeting could be used, the sender could have more or less control over the process, or another electronic message could be used. Therefore, the point and scope of the appended claims should not be limited to the description of the preferred versions contained herein.

What is claimed is:

1. A computer implemented method of generating an electronic greeting card and an associated group gift from multiple parties comprising:
    sending an electronic notification to selected parties, the electronic notification including a universal resource locator associated with a web page for joining an electronic greeting card for a recipient;
    receiving messages from a plurality of the selected parties, wherein each of the plurality of the selected parties opens the electronic notification via a computer, accesses the web page associated with the universal resource locator, and enters a message for the electronic greeting card via the web page;
    prompting the selected parties to make a financial contribution for a group gift associated with the electronic greeting card;
    electronically receiving financial contributions to the group gift associated with the electronic greeting card from a group of the selected parties via the web page;
    prompting the plurality of the selected parties to provide electronic contact information for additional parties to be added to the selected parties;
    sending an electronic notification to the additional parties, the electronic notification including the universal resource locator associated with a web page for joining the electronic greeting card for a recipient and making a financial contribution to the group gift associated with the electronic greeting card;
    after receiving the financial contributions from the group of the selected parties, receiving a selection of the group gift, wherein a total amount of the financial contributions is in excess of a cost of the selected group gift;
    returning the excess of the financial contributions to the group of the selected parties;
    transmitting the electronic greeting card to the recipient, the electronic greeting card including the messages entered by the plurality of the selected parties and a notification of the group gift; and
    after transmitting the electronic greeting card to the recipient,
        receiving one or more messages for the electronic greeting card via the web page, and
        adding the received one or more messages to the electronic greeting card.

2. The method of claim 1 wherein entering a message for the electronic greeting card via the web page comprises creating a text message.

3. The method of claim 1 wherein transmitting the electronic greeting card to the recipient comprises sending an electronic notification to the recipient, the electronic notification including a universal resource locator associated with a web page.

4. The method of claim 1 further comprising generating an address list of selected parties.

5. A computer implemented method of generating an electronic greeting and an associated group gift from multiple parties comprising:

generating a list of the electronic addresses of selected parties to be invited to participate in an electronic greeting and a group gift;

sending an electronic notification to the electronic addresses of the selected parties, the electronic notification including a universal resource locator associated with a web page for joining an electronic greeting for a recipient;

receiving messages from a plurality of the selected parties, wherein each of the plurality of the selected parties opens the electronic notification via a computer, accesses the web page associated with the universal resource locator, and enters a message for the electronic greeting via the web page;

prompting the selected parties to make a financial contribution for a group gift associated with the electronic greeting card;

electronically receiving financial contributions to the group gift associated with the electronic greeting from a group of the selected parties via the web page;

prompting the plurality of the selected parties to provide electronic contact information for additional parties to be added to the selected parties;

sending an electronic notification to the additional parties, the electronic notification including the universal resource locator associated with a web page for joining the electronic greeting for the recipient and making a financial contribution to the group gift associated with the electronic greeting card;

after receiving the financial contributions from the group of the selected parties, receiving a selection of the group gift, wherein a total amount of the financial contributions is in excess of a cost of the selected group gift;

returning the excess of the financial contributions to the group of the selected parties;

sending an electronic notification to the recipient, the electronic notification including a universal resource locator associated with a web page having the messages provided by the plurality of the selected parties and a notification of the group gift; and after sending the electronic notification to the recipient,
  receiving one or more messages for the electronic greeting, and
  adding the received one or more messages to the electronic greeting.

6. The method of claim 5 wherein entering a message for the electronic greeting via the web page comprises creating a text message.

7. The method of claim 5 further comprising sending an electronic notification to an initiator of the electronic greeting and group gift each time one of the selected parties enters a message for the electronic greeting.

8. The method of claim 7 further comprising sending an electronic notification to the initiator of the electronic greeting and group gift each time one of the selected parties makes a contribution to the group gift.

* * * * *